United States Patent [19]
Donkin

[11] Patent Number: 5,152,228
[45] Date of Patent: Oct. 6, 1992

[54] UNIVERSAL COUPLING ADAPTER FOR RAIL-HIGHWAY VEHICLES

[75] Inventor: Thomas G. Donkin, Crete, Ill.

[73] Assignee: Wabash National Corporation, Lafayette, Ind.

[21] Appl. No.: 710,099

[22] Filed: Jun. 4, 1991

[51] Int. Cl.$^5$ ............................................... B61F 3/12
[52] U.S. Cl. ...................................... 105/4.1; 105/4.2; 105/215.1
[58] Field of Search .................. 105/4.1, 4.2, 4.3, 159, 105/215.1; 410/45, 52, 53, 56, 57

[56] References Cited

U.S. PATENT DOCUMENTS

| | | | |
|---|---|---|---|
| 4,766,818 | 8/1988 | Wicks et al. | 105/4.3 |
| 4,773,336 | 9/1988 | Orb | 105/4.2 X |
| 4,784,066 | 11/1988 | Ellis | 105/4.3 X |
| 4,813,555 | 3/1989 | Cripe et al. | 105/4.3 |
| 4,817,537 | 4/1989 | Cripe et al. | 105/404 |
| 4,887,535 | 12/1989 | Mangone | 105/3 |
| 4,917,020 | 4/1990 | Wicks et al. | 105/4.3 |
| 4,938,151 | 7/1990 | Viens | 105/4.3 |
| 4,961,676 | 10/1990 | Gourdin | 410/53 |
| 4,981,082 | 1/1991 | Wicks | 105/4.1 |
| 5,040,466 | 8/1991 | Wicks et al. | 104/4.3 |

FOREIGN PATENT DOCUMENTS 241099 10/1987 European Pat. Off. .............. 105/4.2

Primary Examiner—Robert J. Oberleitner
Assistant Examiner—Kevin D. Rutherford
Attorney, Agent, or Firm—Trexler, Bushnell, Giangiorgi & Blackstone, Ltd.

[57] ABSTRACT

A universal coupling adapter connectable to either end of a rail-highway vehicle useful in forming trains of rail-highway vehicles for rail transport comprises a bolster connectable with a rail bogie. The bolster has a support member bearing a semi-trailer mount and a connection assembly. The semi-trailer mount is constructed so as to engage and support a rail-highway vehicle. The connection assembly comprises a connecting slot and a connecting link, with the connecting link, in one embodiment, being shiftable between an extended and a retracted position. The connecting link is disposed substantially within the connecting slot in the extended position, and is disposed substantially outside of the connecting slot in the retracted position. The connection assembly is connectable with a corresponding connection assembly disposed on a rail-highway vehicle. The bolster has an assembly for connecting the bolster to one of a rail car and a locomotive. In another embodiment, the connection assembly comprises a tongue and a slot offset from each other.

22 Claims, 8 Drawing Sheets

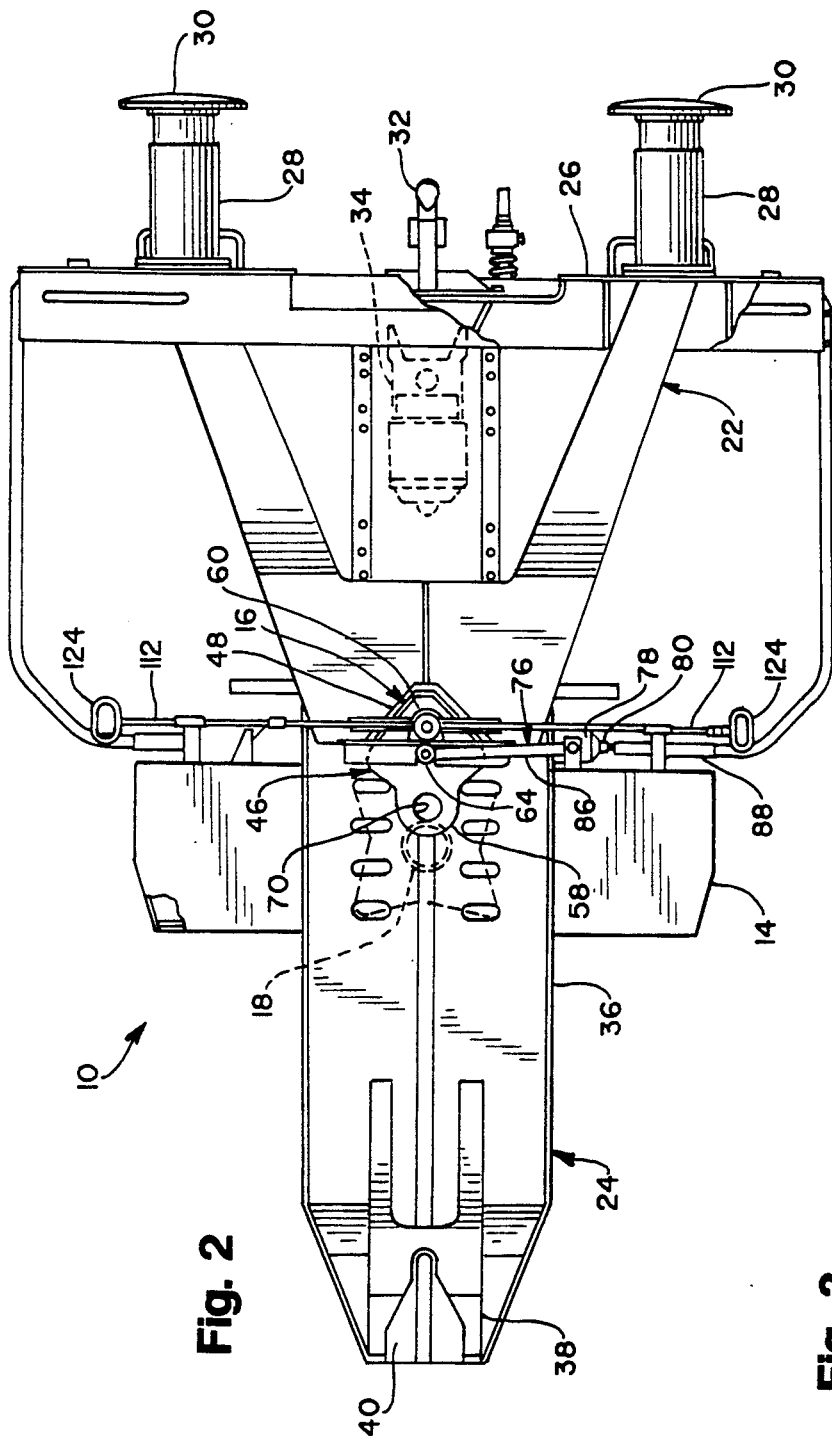
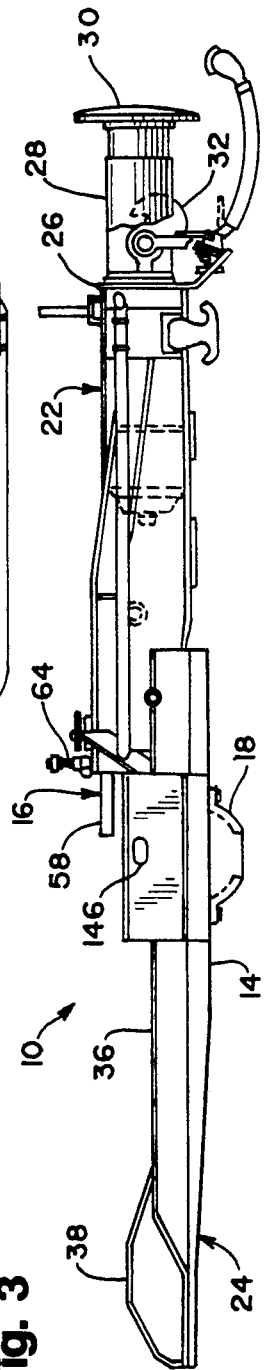
Fig. 2
Fig. 3

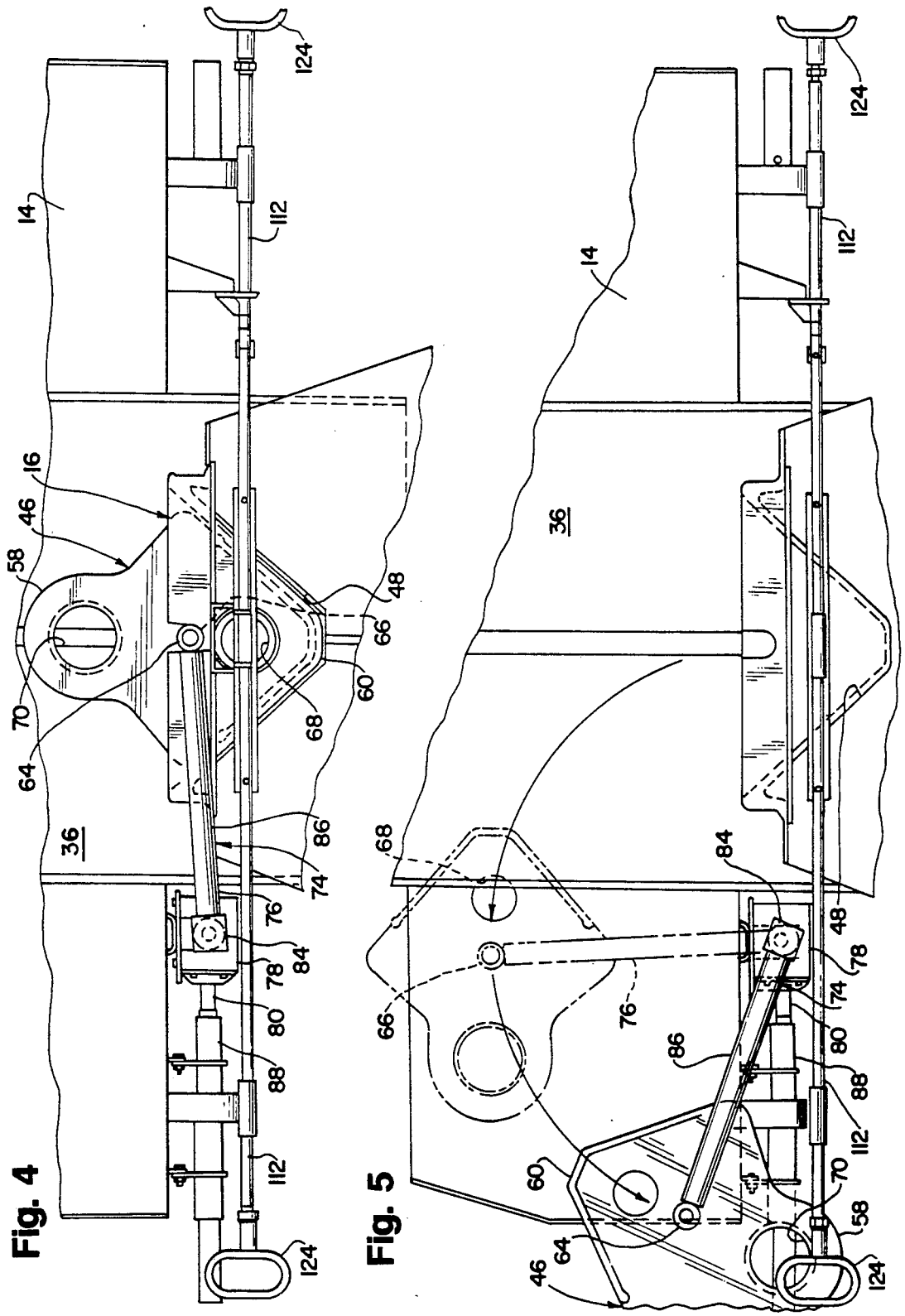

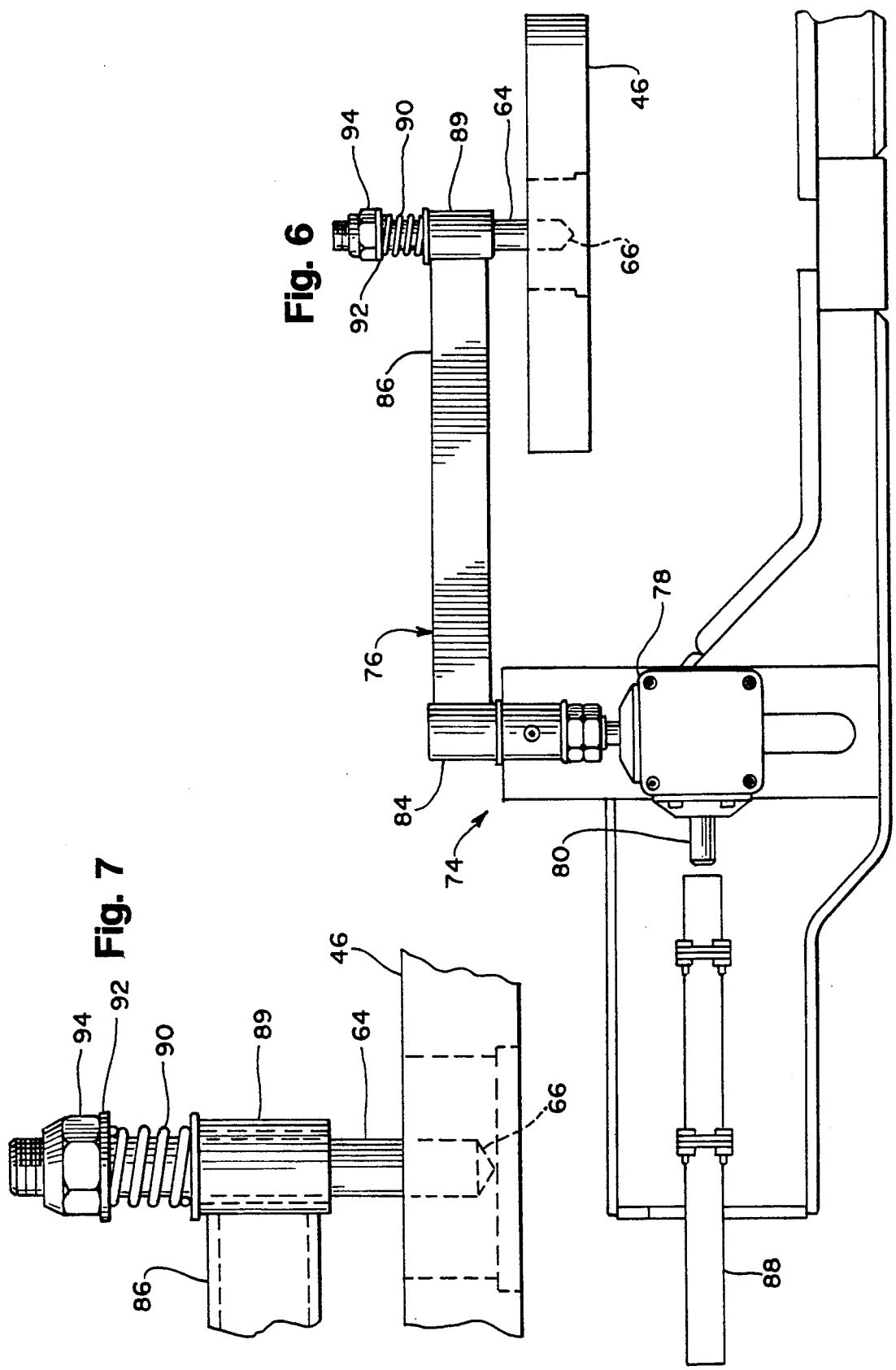

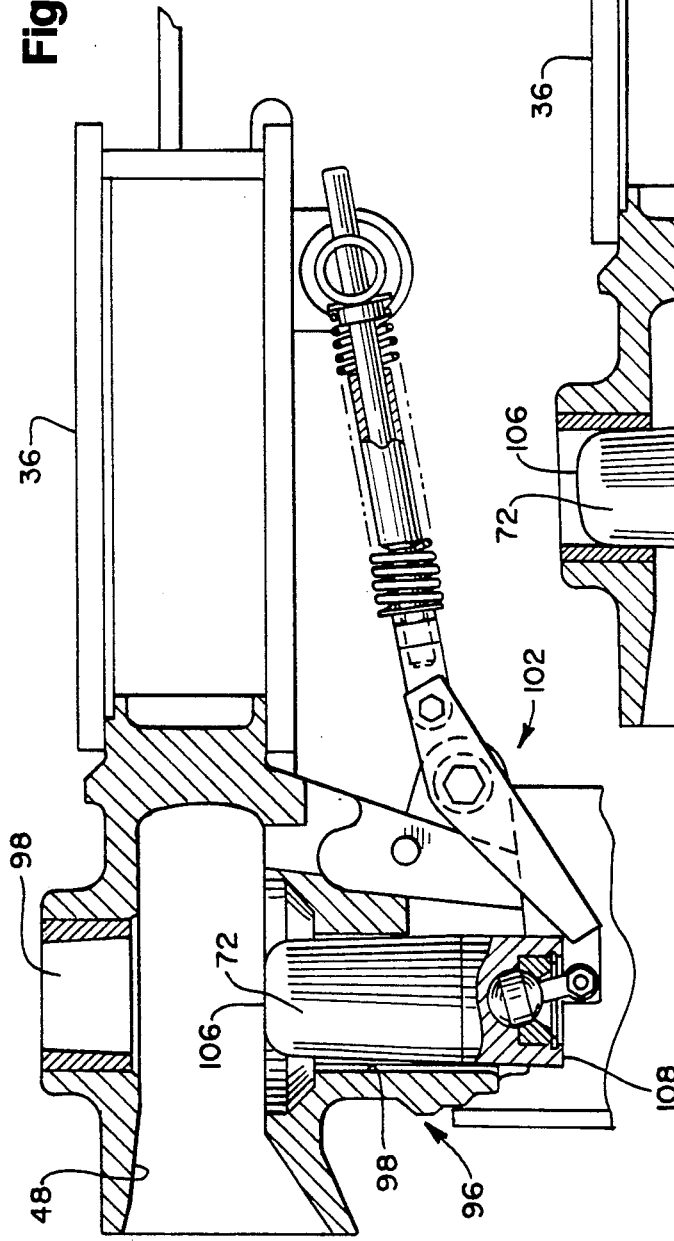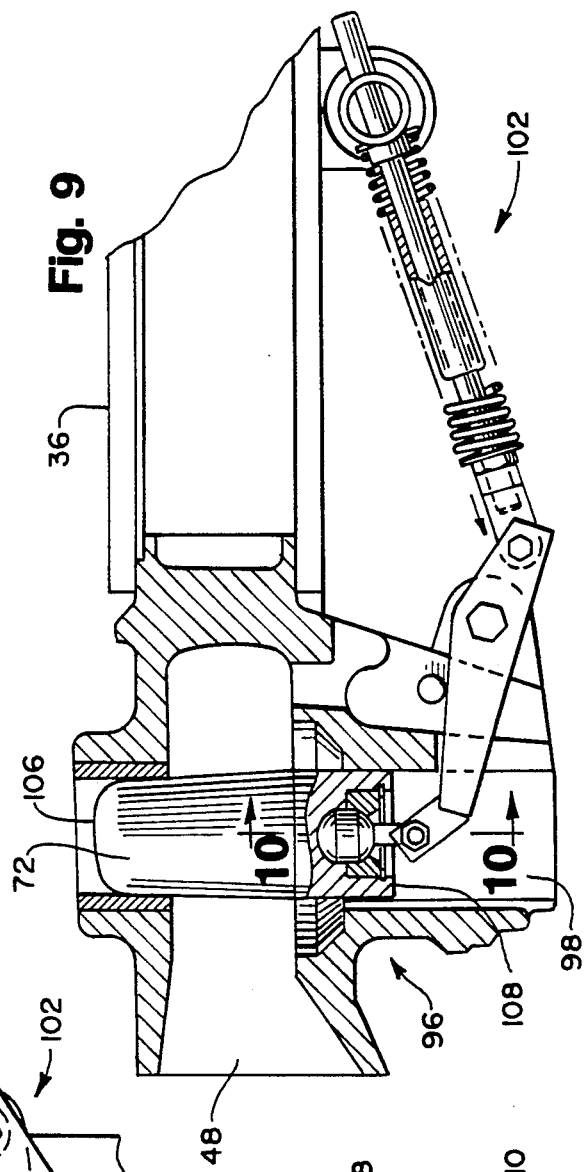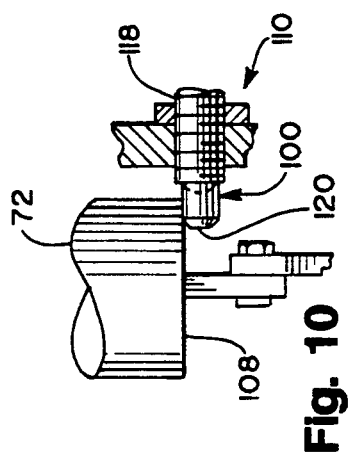

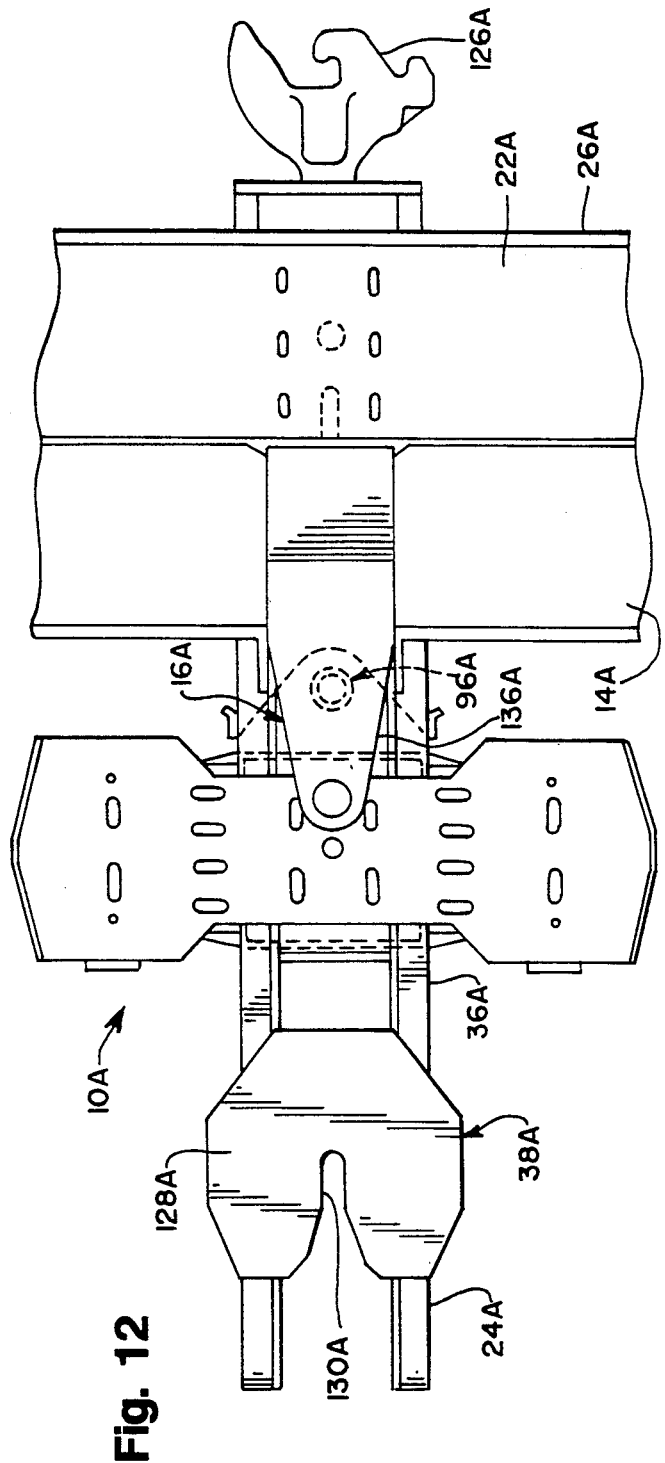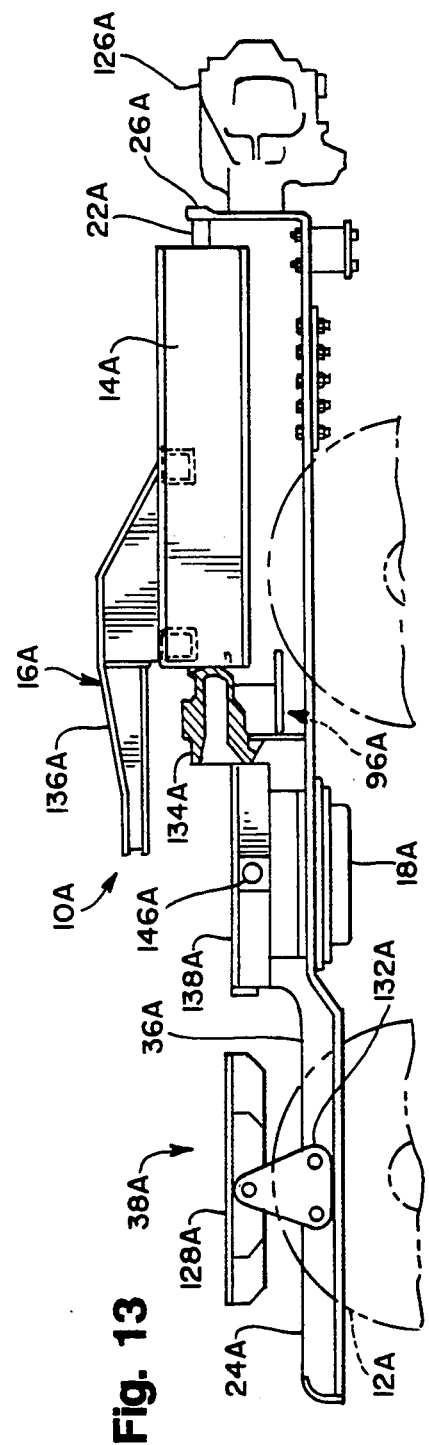
Fig. 12
Fig. 13

UNIVERSAL COUPLING ADAPTER FOR RAIL-HIGHWAY VEHICLES

BACKGROUND AND SUMMARY OF THE INVENTION

The present invention relates to a universal coupling adapter or transition vehicle for use with rail transportation of bi-modal rail-highway vehicles. More specifically, the invention relates to a universal coupling adapter or transition vehicle for use with transporting rail-highway vehicles by rail and constructed so that a single universal coupling adapter can be used on either end of an inter-modal rail-highway vehicle.

Modern transportation systems must be highly flexible and economically viable to meet the demands of users of those systems. For at least a century, railroad transportation has been the transportation mode of choice to ship goods from one place to another. Accordingly, many manufacturing plants were built in close proximity to rail lines. Some plants even have constructed their own railway feeder lines so that raw materials could be easily supplied to the plant by rail, and the goods manufactured thereby could be easily transported to market by rail.

In the modern business world, however, some plants and markets, especially urbanly located retail department stores, do not have their own servicing rail lines. Accordingly, an alternative mode of transportation must be used to service these entities, or at least to transport goods from a rail head to the stores. Transportation by truck is a logical alternative, using a truck to transport the goods from the rail head to the markets. This method requires that the goods be unloaded from a rail car and loaded in a truck semi-trailer. This unloading/loading activity is time consuming, and very labor intensive, thereby rendering this particular employment of trucks economically unsound.

A more enlightened approach mounts semi-trailers, loaded with goods, on rail cars themselves. Thus, when the train reaches the rail head, the entire semi-trailer is removed from the train, whereupon a tractor can be attached to the semi-trailers to transport them to the market. Some employments of this approach place the semi-trailers on a rail car having a flat bed by means of a crane, or other lifting device. This method is costly in equipment. Alternatively, a railway coupler bogie, similar in construction to a conventional railway carriage, is attached to both ends of the semi-trailers, with consecutive railway coupler bogies joined to form a train of semi-trailers.

The general construction of railway coupler bogies useful in intermodal transportation is well known in the relevant art, as is evident, for example, from the following patents.

| Madden | 2,844,108 | 07/22/58 |
|---|---|---|
| Dobson | 2,963,986 | 12/13/60 |
| Hindin, et al. | 4,342,265 | 08/03/82 |
| Bakka, et al. | 4,653,966 | 03/31/87 |
| Wicks, et al. | 4,669,391 | 06/02/87 |
| Mangone | 4,869,177 | 09/26/89 |
| Lienard, et al. | 4,922,832 | 05/08/90 |
| Gourdin | 4,961,676 | 10/09/90 |

Generally, the railway coupler bogies of the prior art comprise a rail wheel bearing railway carriage supporting an intermodal adapter which attaches to one end of a semi-trailer. When both ends of a semi-trailer are attached to bi-modal adapters, the semi-trailer is raised, causing the road wheels of the semi-trailer to become disposed above the ground, thereby bringing the rail wheels into contact with the rails, and allowing motion of the semi-trailer and the bogies on the tracks by means of the rail wheels.

The railway bogie adapter disclosed in the patent of Ellis, U.S. Pat. No. 4,784,066, performs substantially similar to the above-described process to create a train of semi-trailers. When this adapter is used, however, a railroad worker must plan ahead which end of the train of semi-trailers will be coupled to a locomotive, or other rail car, because different embodiments of the adapter must be used depending upon which end of the train of semi-trailers will be connected to a rail car or locomotive. Thus, a user of this adapter must keep a supply of both embodiments on hand, thereby leading to cost inefficiencies. Also, the planning of the railroad worker may be unreliable considering the possibility of a late arrival who wishes to attach his semi-trailer to an already formed train.

The patent of Orb, U.S. Pat. No. 4,773,336, discloses a railroad bogie for removably supporting coupled semi-trailers. The semi-trailers used with this bogie affect the connection between successive semi-trailers themselves, in that one end of the semi-trailers bears a projecting tongue while the other end bears a corresponding, complementary slot. The thusly joined semi-trailers are attached to the bogies by means of apertured blocks or retaining pins. In order to attach a train of semi-trailers selectively at either end thereof to a locomotive, this bogie requires the use of a coupling member, distinct from the bogie, which accepts a hook on the locomotive. The required use of the coupling member contributes to the cost of use and time needed to put a train together.

The patent of Wicks, et al., U.S. Pat. No. 4,917,020, discloses a transition vehicle for connecting convertible rail-highway semi-trailers with a railway coupling mechanism usually found on a locomotive or other rail car. The transition vehicle has retractable road wheels which pivot between an extended and a retracted position. In the extended position, the road wheels engage the ground, forcing the rail wheels upward and away from the ground. When the road wheels are retracted away from the ground, the rail wheels engage the rails so that the semi-trailer can be transported by rail. This transition vehicle, due to the constant presence of the rail wheels, significantly adds to the weight associated with the semi-trailers when the road wheels are used. This added weight could limit the size of loads carried, while also possibly increasing fuel consumption, thereby increasing the cost of use.

The patent of Wicks, U.S. Pat. No. 4,981,082, discloses another type of railway-highway intermodal transportation vehicle. The use of this vehicle, however, demands that a crane be used to properly form a train of semi-trailers. The necessity of the crane can cause operations problems if space in the rail yard is limited, as well as economic problems due the cost of the crane, its maintenance, and the profits lost due to the crane's down time.

OBJECTS AND SUMMARY OF THE INVENTION

A general object of the present invention is to provide a coupling adapter or transition vehicle for use with bi-modal rail-highway vehicles having a plurality of differently constructed connecting and/or coupling means rendering the coupling adapter universally applicable.

A more specific object of the invention is to provide a universal coupling adapter for use with rail-highway vehicles having connecting means rotatable between at least an extended position and a retracted position capable of utilization when in the extended position.

Another object of the present invention is to provide a universal coupling adapter for use with rail-highway vehicles which is connectable to either end of a semi-trailer at one end thereof and is also connectable to a rail car, a locomotive, or other vehicle.

An additional object of the invention is to provide a universal coupling adapter for use with rail-highway vehicles which forms a train by joining one semi-trailer to another, as opposed to forming a train by joining a semi-trailer to an adapter, and the adapter to another semi-trailer.

A universal coupling adapter, constructed according to the teachings of the present invention, connectable to either end of a rail-highway vehicle useful in forming trains of rail-highway vehicles for rail transport comprises a bolster connectable with a rail bogie. The bolster has a support member bearing a semi-trailer mount and connection means. The semi-trailer mount is constructed so as to engage and support a rail-highway vehicle. The connection means comprises a connecting slot or socket and a connecting link or tongue, with the connecting link being shiftable between an extended and a retracted position. The connecting link is disposed substantially within the connecting slot in the extended position, and is disposed substantially outside of the connecting slot in the retracted position. The connection means are connectable with corresponding connection means disposed on a rail-highway vehicle. The bolster has means for connecting the bolster to one end of a rail car and a locomotive. In another embodiment, the connection means comprises a tongue and a slot or socket offset from each other so as to be selectively engagable with a complementary connecting element.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 2 is a top view of the bolster used in the European embodiment of the universal coupling adapter of the present invention showing the unique construction thereof;

FIG. 3 is a side elevational view of the bolster of FIG. 2 showing the particular construction thereof;

FIG. 4 is an enlarged partial top view of the connecting means, used to attach a semi-trailer to the bolster, showing the connecting link in the extended position and disposed in the connecting slot;

FIG. 5 is an enlarged partial top view, similar to that of FIG. 4, showing the connecting link rotated into the retracted position, thereby allowing the female portion of the connecting means or connecting slot to accept a connecting tongue on the front of a semi-trailer;

FIG. 6 is an enlarged partial edge view of the connecting link translation means, the gear box, and cranking shaft, used to position the connecting link, illustrating the construction thereof;

FIG. 7 is an enlarged partial edge view of a portion of the connecting link translation means shown in FIG. 6;

FIG. 8 is an enlarged partially sectioned side view of the connecting slot and the tongue locking means showing its construction, with the locking pin in the unlocked position;

FIG. 9 is an enlarged partially sectioned side view similar to that of FIG. 8, showing the locking pin in the locked position;

FIG. 10 is a partial sectional view, taken along line 10—10 of FIG. 9, of the locking pin in the locked position showing the locking pin retaining means engaged with a portion of the locking pin;

FIG. 12 is a partial top view of a bolster used with a universal coupling adapter, particularly adapted for use with rail systems in the United States, showing the particular construction thereof;

FIG. 13 is a partial side elevational view of the bolster shown in FIG. 12;

DETAILED DESCRIPTION OF THE PREFERRED EMBODIMENTS

Figure 1:
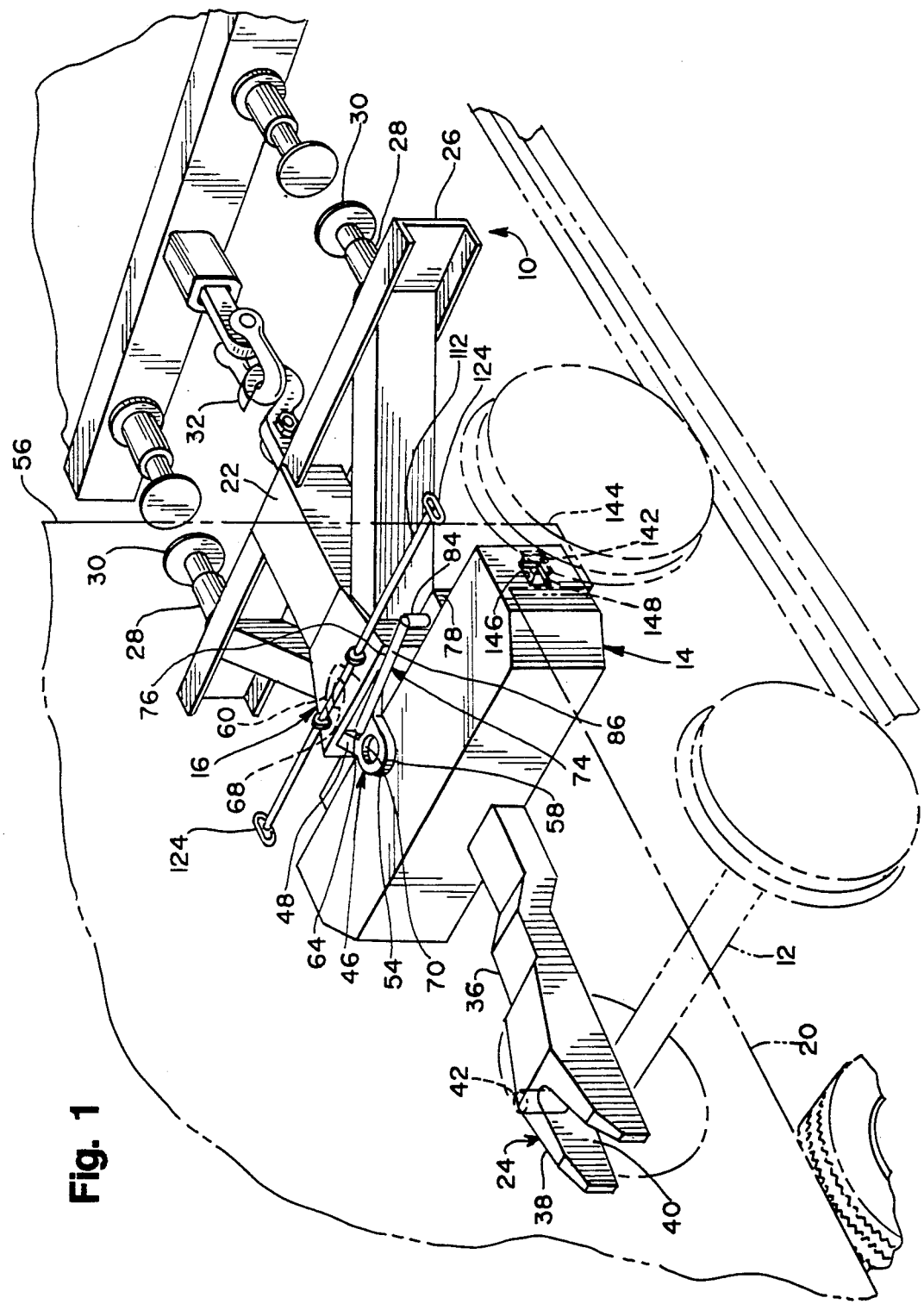
FIG. 1 is a simplified fragmentary perspective view of a train of semi-trailers connected by a universal coupling adapter, constructed according to the teachings of the present invention, particularly adapted for use in European rail systems, to a rail car.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The objects and advantages of the universal coupling adapter or transition vehicle, constructed according to the teachings of the present invention, are encompassed in at least two embodiments. One embodiment is especially for the rail systems in the United States which use automatic knuckle couplers to make connections between successive rail cars, or between a rail car and a locomotive. Another embodiment is for the rail systems in Europe which do not use knuckle couplers, but use a hook coupling mechanism. The first embodiment of the invention is shown in FIG. 1 through FIG. 7. A second embodiment is shown in FIGS. 12, and 13, and elements thereof similar to the first embodiment are designated by the same reference numerals having the suffix "A." FIGS. 8 through 11 disclose elements and constructions common to both embodiments.

Figure 14A:
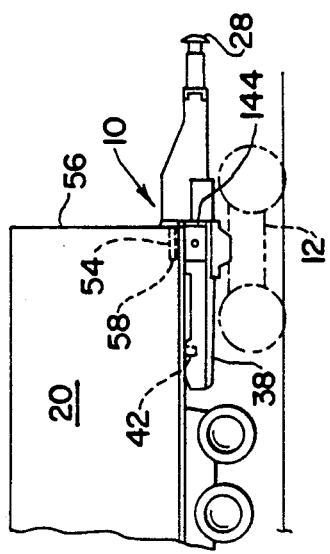
FIG. 14A is a partial diagrammatic elevational view of a train of semi-trailers connected at its back end to a universal coupling adapter for use in European rail systems.
Figure 15A:
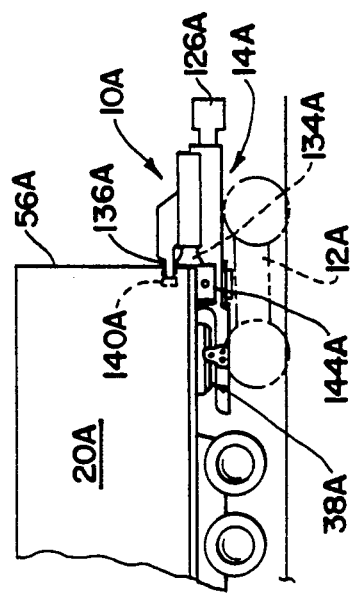
FIG. 15 and FIG. 15A are respectively similar to FIG. 14 and FIG. 14A, but show an embodiment constructed according to the teachings of the present invention for use with rail systems in the United States.
Figure 14:
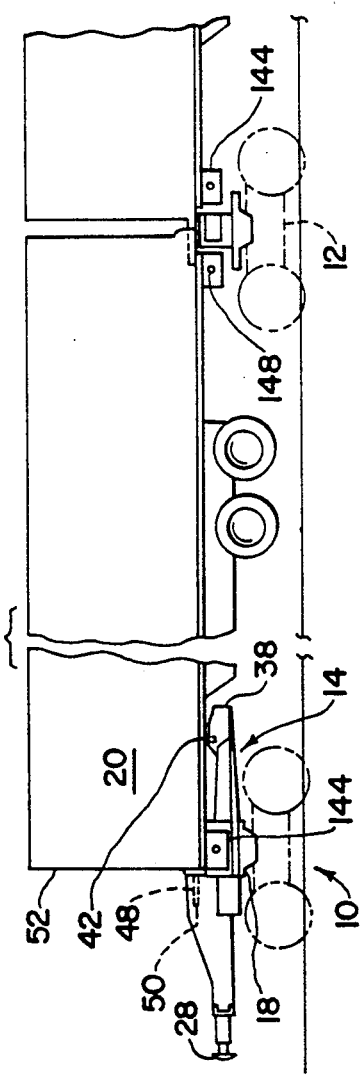
FIG. 14 is a partial diagrammatic elevational view of a train of semi-trailers connected at its front end to a universal coupling adapter, constructed according to the teachings of the present invention for use in European rail systems.
Figure 15:
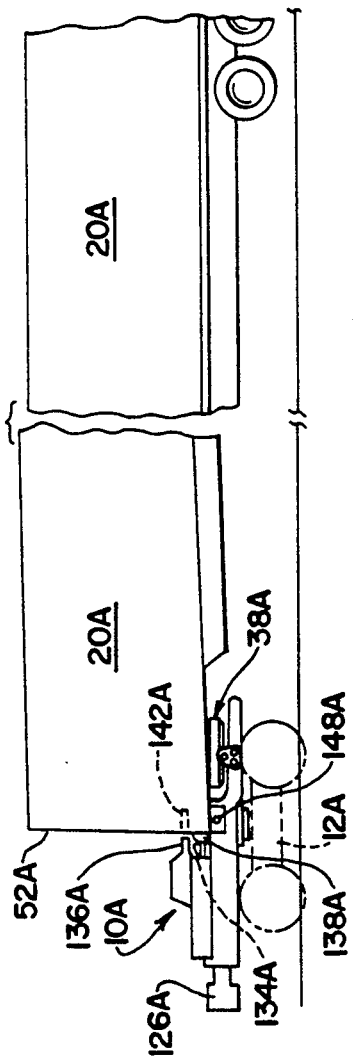

Referring initially to FIG. 1, a universal coupling adapter 10, particularly constructed according to the teachings of the present invention for use in rail systems of the type commonly used in Europe, is shown. The universal coupling adapter 10 comprises a rail bogie 12, a bolster 14, and connection means 16 disposed on the bolster 14. The rail bogie 12, only partially shown in FIG. 1 in broken lines for clarity, is of well known construction, and is substantially similar to a conventional railway carriage. The bolster 14 is connected to the rail bogie 12 at a bowl 18, shown in FIG. 3. The bowl 18 allows the bolster 14 to pivot, so that the rail bogie 12 can move around a curve without derailing. The rail bogie 12 can also be attached to other bolsters to perform other functions, such as supporting two connected semi-trailers 20, as shown in FIG. 14, FIG. 14A and FIG. 15. The dimensions of the rail bogie 12 conforms to the conventionally accepted European rail gauges. Therefore, the universal coupling adapter 10 can be used effectively throughout the European railway system.

The bolster 14 has at least a first end 22 and a second end 24 which are opposite from each other, as shown in FIG. 2. The first end 22 is defined by a headstock 26. The headstock 26 is substantially rectangular in shape and extends the entire width defined by the bolster 14 and the rail bogie 12. The headstock 26 supports buffers 28 disposed on either side of the headstock 26. The buffers 28 extend, in a horizontal fashion, substantially perpendicularly away from the headstock 26 opposite to the second end 24.

The buffers 28 are of known construction, and are commonplace in European rail systems. Essentially, the buffers 28 comprise a pair spring loaded pistons each having a head 30 which, when the universal coupling adapter 10 is connected to a rail car or locomotive, corresponding heads of buffers on that other vehicle contact the heads 30 of the universal coupling adapter 10. The contact between the heads 30 of the adapter 10 and the heads on the rail car or locomotive transmits longitudinal traction and compression forces along the various elements of a train when it is in motion. Also on the first end 22, a drawhook 32 extends from the headstock 26. The drawhook 32 is constructed specifically for use in the European rail systems, and is of well-known construction. For convenience, the drawhook 32 is mounted on a piston 34 so that the drawhook 32 is movable between a retracted and an extended position. The drawhook 32 is used as shown in FIG. 1 for coupling the universal coupling adapter 10 to a loop or ring on a rail car or a locomotive. In this instance, the drawhook 32 is attached to a coupling means on the rail car. The coupling means is also of well-known construction.

As shown more clearly in FIG. 3, the bolster 14 has a support member 36 which extends from the first end 22 to the second end 24. The support member 36 is constructed to increase the structural integrity of the universal coupling adapter 10, and assists in distributing load forces to the rail bogie 12. Proximate to the second end 24, the support member 36 forms a semi-trailer mount 38 having a bell-mouthed slot 40, which is constructed so as to accept a kingpin 42 located on the bottom of a semi-trailer 20, as shown in FIG. 1. Also on the support member 36, approximately midway between the first end 22 and the second end 24, on a side thereof opposite to the bowl 18, connection means 16 is disposed. The connection means 16 comprises complementary male and female connecting elements in the form of a connecting link 46 and a connecting socket or slot 48, as shown in FIG. 4 and FIG. 5. The connecting slot 48, illustrated in FIGS. 5, 8, and 9, is constructed so as to accept a tongue 50 disposed on a front end 52 of a semi-trailer 20. As such, the connecting socket or slot 48 is constructed substantially similar to a socket or slot 54 on a back end 56 of a semi-trailer 20. Thus, as will be discussed more fully herein, the slot 54 on the back end 56 of one semi-trailer 20 can accept the tongue 50 on the front end 52 of an adjacent semi-trailer 20, thereby joining two semi-trailers 20 to form a train thereof, as shown in FIG. 14, FIG. 14A and FIG. 15. Additionally, the connecting socket or slot 48 on the universal coupling adapter 10 can accept the tongue 50 on the front end 52 of an adjacent semi-trailer, thereby joining the semi-trailer 20 to the universal coupling adapter 10, and allowing the adapter 10, and thus a train of semi-trailers 20 to be coupled to a rail car or to a locomotive. Accordingly, the tongue 50 and the socket or slot 54 comprise connection means which correspond to the connection means 16 on the bolster 14. The connecting socket or slot 48 is of sufficient size to allow the tongue 50 to pivot therein about a fixed point, discussed in the following paragraphs, to allow for motion of the train along a curve, for instance.

However, for the coupling adapter 10 to be truly universal, the adapter 10 must be able not only to accept a tongue 50 on the front end 52 of a semi-trailer 20, but must also be able to be connected to the back end 56 of a semi-trailer 20. To do this, the connecting tongue or link 46 is employed. Accordingly, the connecting link 46 is shiftable between an extended position, shown in FIG. 4, and a retracted position, shown in FIG. 5, to allow the universal coupling adapter 10 to be connectable to either end of a train of semi-trailers 20.

The connecting link 46 has a first side 58 presenting a first tongue and a second side 60 presenting an oppositely extending tongue divided by a latitudinal midline. The connecting link 46 is pivotally mounted to a pivot pin 64 about a mounting aperture 66 disposed on the connecting link 46 about the midline. The particular connection between the pivot pin 64 and the connecting link 46 is shown clearly in FIG. 7. The first side or tongue 58 of the connecting link 46 has a construction substantially similar to a corresponding construction of a tongue 50 on the front end 52 of a semi-trailer 20. The first side 58 has a connecting aperture 70 which accepts a connecting member disposed in the slot or socket 54 on the back end 56 of a semi-trailer 20. The first side 58 thus mimics the function of a tongue 50 by allowing the adapter 10 to be connected to the back end of a train of semi-trailers 20, when the connecting link is in the extended position.

The second side or tongue 60 of the connecting link 46 is substantially wider than the first side 58 thereof because the second side 60 is constructed to be insertable in the connecting slot 48 of the universal coupling adapter 10. Whereas the first side 58, like the tongue 50 as alluded to above, is constructed to allow for the motion of the train, the second side or tongue 60 is intended to remain firmly substantially stationary in the connecting slot 48. As shown in FIG. 4, the second side 60 entirely fills the connecting slot or socket 48 when the connecting link is in the extended position.

The second side or tongue 60 also has a locking hole 68 therein, constructed similar to the connecting aperture 70, of sufficient size to accept a locking pin 72, shown in FIG. 8 and FIG. 9, which serves to hold either the second side or tongue 60. The pin 72 also is adapted to hold the tongue 50, which also has a hole similar to the locking hole 68, on the front end 52 of a semi-trailer 20 firmly inside the connecting slot 48. The structure and function of the locking pin 72 will be discussed more fully herein.

As shown in FIG. 5 and FIG. 6, the connecting link 46 is connected at its mounting aperture 66 by means of the pivot pin 64 to a connecting link translation means 74. The connecting link translation means 74 comprises the pivot pin 64, a support arm 76, a connecting link cranking mechanism in the form of a gear box 78, a cranking shaft 80, and a cranking tool guide or tube 88. The pivot pin 64 is fixed to the connecting link 46 at the mounting aperture 66. The pivot pin 64 extends upwards substantially perpendicularly to a horizontal plane defined by the connecting link 46 towards the support arm 76.

The support arm is essentially "L" shaped, having a base 84 and a leg 86. An end of the leg 86 opposite to the base 84 terminates at a tube 89. The tube 89 has a diameter sufficient to accept the pivot pin 64 and to allow the pivot pin 64 to move axially within the tube 89 as well as to rotate within the tube 89, so that the connecting link 46 can be disposed out of the way when not needed. A spring 90, a washer 92, and a nut 94 are disposed on a portion of the pivot pin 64 opposite to the connecting link 46 and beyond the tube 89. The combination of the spring 90, the washer 92, and the nut 94 maintains the pivot pin 64 within the tube 89, and assures that the coupling link 46 is at the appropriate level so that the second side 60 can be inserted into the connecting slot 48.

The base 84, at an end thereof opposite to the leg 86, of the support arm 76 is pivotally connected to one end of the gear box 78. The gear box 78 contains gears and other mechanical devices for applying rotational forces to the base 84, thereby shifting the connecting link 46 between the extended and the retracted positions. The cranking shaft 80 is disposed through the gear box 78 to that a force applied to the gear box 78 can actuate the gears and other mechanical devices to shift the connecting link 46. As shown in FIG. 6, the tube 88 is disposed in axial alignment with the cranking shaft 80. The tube 88 communicates from the cranking shaft 80 to the exterior of the adapter 10 and serves as a guide thereby facilitating alignment of a cranking tool, not shown, with the cranking shaft 80 so that a force may be applied thereto to shift the connecting link 46.

Figure 11:
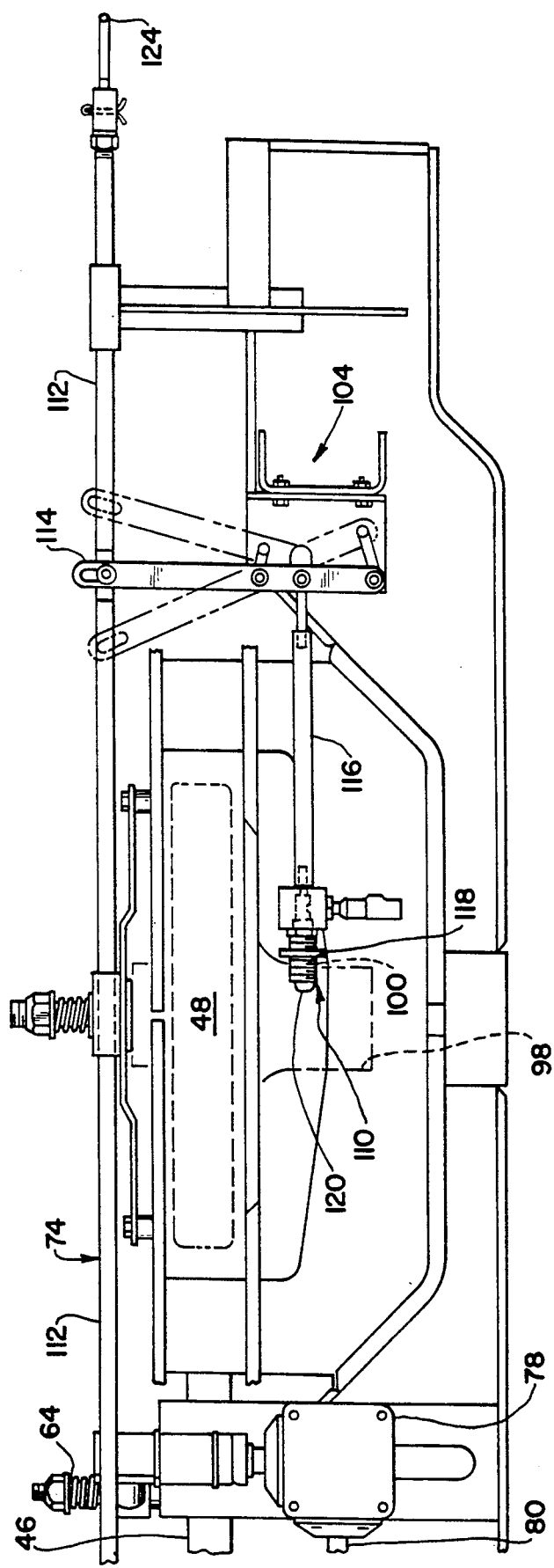
FIG. 11 is an end elevational view of the connecting means, clearly showing the relationships between the elements thereof, as well as the locking pin retaining member actuation means.

The illustrations of FIG. 8 through FIG. 11 are common to both of the disclosed embodiments. The connecting link translation means 74 is shown in FIG. 11 to give proper perspective.

Tongue locking means 96, shown in FIG. 8 through FIG. 11, are provided proximate to the connecting slot or socket 48. The tongue locking means 96 is constructed to hold a tongue 50 on the front end 52 of a semi-trailer 20 in the connecting slot or socket 48 (and also, the second side or tongue 60 of the connecting link 46 in the connecting slot 48 when the link 46 is in the extended position), thereby connecting the semi-trailer 20 to the universal coupling adapter 10.

The tongue locking means 96 comprises a bore 98 in the link providing the socket, a locking pin 72, locking pin shifting means 102, a locking pin retaining member 100, and a locking pin retaining member actuation means 104. The bore 98 is disposed substantially perpendicularly through the connecting slot 48 about midway along the depth of the connecting slot 48, as shown in FIG. 8. The bore 98 is of sufficient size to accept the locking pin 72, and accordingly is similar in configuration to the locking hole 68 on the second side 60 of the connecting link 46, and to a hole on the tongue 50 on a semi-trailer 20, as it is necessary that the locking pin 72 be able to penetrate both to make a secure connection.

The locking pin 72 is substantially cylindrical in shape in order to facilitate movement of the locking pin 72 within the bore 98. The locking pin 72 has a first end 106 and a second end 108 opposite to the first end 106. The first end 106 is substantially planar and smooth, and is configured to facilitate insertion of the locking pin 72 into the locking hole 68 or the hole in a tongue 50 on a semi-trailer 20. The second end 108 is connected to the locking pin shifting means 102.

The locking pin 72 is capable of axial movement within the bore 98 between an unlocked position, shown in FIG. 8, and a locked position, shown in FIG. 9, under the influence of the locking pin shifting means 102. When in the unlocked position, the locking pin 72 does not in any way obstruct the connecting slot 48 so as to facilitate insertion therein of either a tongue 50 or the second side 60. In the locked position, the locking pin 72 protrudes through the connecting slot 48, and through any aperture disposed therein, thereby forming a connection between the adapter 10 and either a semi-trailer 20 or the connecting link 46.

The locking pin retaining member 100, shown in FIG. 10 and FIG. 11, is used to maintain the locking pin 72 in the locked position. The locking pin retaining member 100 is part of a greater locking pin retaining means 110. The locking pin retaining means 110 comprises a handle 112, a lever 114, a rod 116, a channel 118, and the locking pin retaining member 100. The channel 118 extends from the interior to the exterior of the bore 98 at a position just below the second end 108 of the locking pin 72 when in the locked position. The channel 118 is of sufficient size to accept the locking pin retaining member 100, and to allow for axial movement of the member 100.

The member 100 is disposed through the channel 118 with a second end 120 of the member 100 extending into the bore 98. At a second end 122 thereof, the member 100 is connected to the rod 116, which extends from the second end 122 substantially parallel towards the exterior of the universal coupling adapter 10. An end of the rod 116, opposite to the end thereof connected to the member 100, is pivotally joined to the lever 114. The lever 114 extends upwardly away from the rod 116, and, at an end thereof opposite to the end connected to the rod 116, is pivotally connected to the handle 112.

The handle 112 extends across the entire width of the universal coupling adapter 10, and has grips 124 disposed on the ends thereof. As shown clearly in FIG. 11, the handle 112 can be moved back and forth, thereby actuating the lever 114 and the rod 116. Actuation of the rod 116 causes the member 100 to move axially in the channel 118 between an extended and a retracted position. When the member 100 is in the retracted position, the first end 122 thereof is not disposed within the bore 98. This allows for easy shifting of the locking pin 72. When the locking pin 72 is in the unlocked position, the member 100 cannot be extended because interference with the locking pin 72. When the locking pin 72 is in the closed position, that interference is removed, and the member 100 can be moved, by pushing or pulling the grips 124 on the handle 112, fully into the extended position, shown in FIG. 10. When in the extended position, the member 100 engages the second end 108 of the locking pin 72, thereby insuring that the locking pin 72 will remain in the extended position.

When the universal coupling adapter or transition vehicle 10 is to be connected to the back end of the semi-trailer 20, holes 142 in blocks 144 disposed on the bottom of the semi-trailers 20, as shown in FIG. 1, FIG. 14, FIG. 14A, and FIG. 15A, are aligned with holes 146 in the bolster 14. Once this alignment is achieved, pins 148 are inserted in the holes 142, through the blocks 144, and into the holes 146 in the bolster 14. The fixation by the pins 148 serves as a secondary connection between the semi-trailer 20 and the bolster 14. Employment and structure of the blocks 144, the pins 148, and the holes 142 and 146 is well-known in the relevant art.

The second embodiment of the universal coupling adapter 10A is illustrated in FIG. 12 and FIG. 13. Expect for the differences detailed in the following paragraphs, the construction and function of this embodiment is substantially similar to the construction and function of the previously described embodiment.

The bolster 14A of the universal coupling adapter 10A is different from the bolster 14 in that the connection means 16A take on a different form. In order to be compatible with rail systems currently in use in rail systems of the type used in the United States, a knuckle coupler 126A is disposed on the headstock 26A of the bolster 14A. The knuckle coupler 126A is commonplace and is of well-known construction.

A semi-trailer mount 38A, disposed on the second end 24A of the support member 36A, is comprised of a plate 128A having a bell-mouthed slot 130A pivotally mounted on a plate support member 132A. The bell-mouthed slot 130A is constructed so as to accept and retain a kingpin 42A disposed on the front end 52A of a semi-trailer 20A, as shown in FIG. 12. The plate 128A is constructed similarly to, and is intended to mimic the trailer mounting plates commonly found on road tractors.

The connection means 16A is different from that used in the first embodiment. In essence, the connection means 16A comprises a plurality of connectors for use in attaching the semi-trailers 20A to the universal coupling adapter or transition vehicle 10A disposed thereon in different, offset horizontal planes. Particularly, the connection means 16A comprise male and female parts in the form of a slot or socket 134A and a tongue 136A disposed above the slot 134A, as shown in FIG. 13. Accordingly, as shown in FIG. 15, when a semi-trailer 20A has its front end connected to the transition vehicle 10A, the semi-trailer 20A is tilted downwardly sufficiently to align the front end tongue 138A with the socket 134A.

The slot 134A is disposed on the bolster 14A in proximity to a substantially planar base 138A also disposed on the bolster 14A. The base 138A is designed to engage and to support the bottom of a semi-trailer 20A. The slot or socket 134A is of sufficient size to accept and firmly hold the tongue 138A on a semi-trailer 20A. The slot 134A is disposed above the base 138A a distance sufficient to align the slot 134A with a tongue 138A when the bottom of a semi-trailer 20A is placed upon the base 138A.

The tongue 136A is disposed above the slot 134A and the base 138A. The tongue 136A is disposed above the base 138A a distance sufficient to align the tongue 136A with a slot 140A when the bottom of a semi-trailer 20A is placed upon the base 138A. In this fashion, the universal coupling adapter 10A can be employed at either end of a train of semi-trailers 20A, and can be connected to either the front end 52A or the back end 56A of a semi-trailer 20A. To lock the tongue 138A in the slot 134A, the tongue locking means 96, not shown for clarity, but disposed beneath the slot 134A in similar fashion as illustrated in FIG. 8 and FIG. 9, can be used.

The operation and use of the above-disclosed inventions will become apparent in the following discussion. With respect to both embodiments, a train of semi-trailers 20 or 20A is formed by inserting the tongue 50 or 138A of one semi-trailer 20 or 20A into the slot 48 or 134A of another. The joint between successive semi-trailers 20 or 20A must be supported by a common rail bogie 12, or other suitable vehicle, as shown in FIG. 14, FIG. 14A, FIG. 15 and FIG. 15A. At the end of the train of semi-trailers 20 or 20A, it is necessary to use a universal coupling adapter 10 or 10A, depending upon the rail system to be used.

Considering the first embodiment, the end of the train of semi-trailers 20 to be coupled to a rail car or locomotive must be examined to determine if the train end exposes either a tongue 50 or a slot 54. Beginning with an adapter 10 having its locking pin 72 in the unlocked position, and the connecting link in the retracted position, if a tongue 50 is exposed, then the universal coupling adapter 10 can be backed up against the semi-trailer 20 so that the kingpin 42 is inserted into the bell-mouthed slot 40 of the semi-trailer mount 38. Simultaneously, the tongue 50 of the semi-trailer 20 will be inserted into the connecting slot or socket 48. If a slot 54 is exposed on the end of the train, the connecting link 46 must be moved into the extended position. To do this, a wrench, or other suitable tool, is inserted into the tube 88 so that the wrench can attach to the cranking shaft 80 in order to actuate the gear box 78. As the cranking shaft is rotated by the wrench, the gear box rotates the support arm 76 so that the connecting link 46 is moved from the retracted to the extended position, thereby causing the second side or tongue 60 of the cranking link 46 to be inserted into the connecting slot 48. With this done, the universal coupling adapter 10 can be backed up, as above, until the first side or tongue 58 of the connecting link 46 is inserted into the slot 54 on the back end 56 of the semi-trailer 20.

Now, the locking pin 72 can be shifted into the locked position by utilizing the locking pin shifting means 102, as disclosed above. When the locking pin 72 is in the locked position, the locking pin retaining member 100 can be shifted into the extended position by utilization of the locking pin retaining member actuation means 104, as discussed previously. To complete the connection, the holes 142 in the blocks 144 are aligned with the holes 146 in the bolster 14, and pins 148 are inserted therethrough. The drawhook 32 extends from the headstock 26, and the train of semi-trailers 20 is ready for coupling with a rail car, or a locomotive.

Regarding the second embodiment, the process depends on whether the end of the train of semi-trailers 20A presents a tongue 138A or a slot 140A. If the train of semi-trailers 20A presents a tongue 138A, the semi-trailer 20A at the end of the train is titled downwardly sufficiently to align the front end tongue 138A with the socket 134A. The universal coupling adapter or transition vehicle 10A is backed up until the bell-mouthed slot 130A on the plate 128A accepts the kingpin 42A on the bottom of the semi-trailer 20A. The front end tongue 138A is simultaneously inserted into the socket 134A to form the train, as shown in FIG. 15. If the end of the train of semi-trailers 20A presents a slot 140A, the transition vehicle 10A is simply backed up until the tongue 136A is inserted into the socket 140A. The disposition of the slots or sockets 134A and 140A and the tongues 136A and 138A in different horizontal planes assures that the proper connection will be made between the universal coupling adapter 10A and the semi-trailer 20A. This being done, the locking pin 72 can be shifted into the locked position, as described above, and the pins 148 can be inserted into the holes 142 in the blocks 144 and into the holes 146 in the bolster 14A. Again the train can be connected to a rail car or to a locomotive for transport.

While preferred embodiments of the present invention are shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A universal coupling adapter for forming trains of rail-highway vehicles having a slot comprising: a bolster; connection means mounted on the bolster; the connection means comprising a connecting slot and a connecting link; connecting link shifting means operatively associated with the connecting link for shifting said link between an extended and a retracted position; the connecting link being disposed substantially within the connecting slot in the extended position, and being disposed substantially outside of the connecting slot in the retracted position; the connection means being selectively connectable to different complementary connecting elements disposed on adjacent opposite ends of the rail-highway vehicle; means located on the bolster for connecting said bolster to one of a rail car, a locomotive, and other vehicles; the connecting link comprising a body having a first side and a second side; the second side being inserted into the connecting slot when the connecting link is in the extended position; the first side being inserted into the slot on said rail-highway vehicle for forming said trains; locking means disposed on said bolster and operatively associated with the connecting slot for holding said second side in said connecting slot; a locking hole disposed on the second side of the body; the locking means comprising a locking pin; means operatively associated with the locking pin for shifting said pin between an unlocked position and a locked position within said hole when the connecting link is in the extended position.

2. A universal coupling adapter as defined in claim 1 further comprising means defining a bore in the bolster for receiving the locking pin in said unlocked position; a channel located in the bolster connected with the bore; a locking pin retaining member operatively associated with said pin; means operatively associated with the locking pin retaining member for shifting said retaining member between a retracted and an extended position; the locking pin retaining member being shiftably disposed within the channel; the retracted position being defined by the locking pin retaining member being disposed entirely within the channel; and the extended position being defined by a portion of the locking pin retaining member being disposed within the bore before and another portion of said retaining member engaging the locking pin.

3. A universal coupling adapter as defined in claim 1 wherein the connecting link shifting means comprises a support arm having a base and a leg; a pivot pin connecting the leg to the connecting link; the connecting link being rotatable about the pivot pin; and a connecting link cranking mechanism connected to the base for shifting the support arm.

4. A universal coupling adapter for forming trains of rail-highway vehicles having a tongue and a slot at opposite ends thereof, the adapter comprising: a bolster; the bolster having a support member for engaging and supporting a rail-highway vehicle, and connection means; the connection means comprising a connecting slot selectively for receiving the tongue of a rail-highway vehicle and a connecting link; the connecting link comprising a first side selectively for insertion into the slot of a rail-highway vehicle for connection to said vehicle and a second side; means operatively associated with the connecting link for shifting said link between an extended and a retracted position; the second side being disposed substantially within the connecting slot then the connecting link is in the extended position for positioning the first side for insertion into the slot of a rail-highway vehicle, and being disposed substantially outside of the connecting slot in the retracted position for permitting insertion of a rail-highway vehicle tongue into the connecting slot; and means located on the bolster for connecting the bolster to one of a rail car, a locomotive, and other vehicles.

5. A universal coupling adapter as defined in claim 4 wherein the means for connecting the bolster comprises a drawhood and a buffer.

6. A universal coupling adapter for forming trains of rail-highway vehicles having a tongue and a slot, the adapter comprising: a bolster; the bolster having a support member for engaging and supporting the rail-highway vehicle and connection means for connection with the tongue and the slot on the rail-highway vehicle; the connection means comprising a slot and a tongue respectively complementary to the tongue and the slot on the rail-highway vehicle, and disposed relatively parallelly offset from each other on the bolster; and means disposed on the bolster for connecting the bolster to one of a rail car, a locomotive and other vehicles.

7. A universal coupling adapter as defined in claim 6 further comprising locking means disposed on the bolster for locking a connection between the connection means on the bolster and the tongue and the slot on the rail-highway vehicle.

8. A universal coupling adapter as defined in claim 7 further comprising a bore operatively associated with the locking means disposed in the bolster; the locking means including a locking pin and means for shifting the locking pin between a locked and an unlocked position; the locked position being defined by the locking pin being disposed through the slot in the bolster; and the unlocked position being defined by the locking pin being disposed outside of the connecting slot and within the bore.

9. A coupling adapter for forming trains of rail-highway vehicles having a first and a second complementary coupling element adjacent opposite ends thereof, the adapter comprising: a bolster; first and second different coupling elements disposed on and facing substantially horizontally outwardly of one end of the bolster for selective coupling with the first complementary coupling element and the second complementary coupling element; and means disposed on and facing outwardly of an end of the bolster opposite to the one end for connection to one of a rail car, a locomotive and other vehicles.

10. A coupling adapter as defined in claim 9 further comprising means on the bolster for shiftably supporting at least one of the coupling elements for movement to and from an operative extended position and a retracted inoperative position; and the at least one of the coupling elements, when in the operative extended position, being interengagable with at least one of the first complementary coupling element and the second complementary coupling element, and, when in the retracted inoperative position, being incapable of interengagement with either the first or second complementary coupling elements.

11. A coupling adapter as defined in claim 9 wherein the first and second different coupling elements are relatively parallelly offset on the bolster for permitting selective connection to either end of a rail-highway vehicle.

12. A coupling adapter as defined in claim 9 wherein one of the different coupling elements comprises a socket on the bolster for receiving at least one of the first complementary coupling element and the second complementary coupling element, and a retractable retaining pin located transverse the socket for engaging and retaining the at least one of the first complementary coupling element and the second complementary coupling element when inserted therein.

13. A coupling adapter as defined in claim 12 further comprising a spring biased over-center linkage mechanism on the bolster for shifting the pin between an extended engaging position and a retracted position.

14. A coupling adapter as defined in claim 13 further comprising means operatively associated with the linkage mechanism, and selectively accessible from opposite sides of said bolster for actuating said mechanism.

15. A coupling adapter as defined in claim 13 further comprising a retractable locking element operatively associated with the retaining pin for releasably locking said pin in engagement with the at least one of the first complementary coupling element and the second complementary coupling element.

16. A transition vehicle for forming trains of bi-modal rail-highway vehicle having different complementary coupling elements adjacent opposite ends thereof, the transition vehicle comprising: a bogie; a bolster on the bogie; male and female coupling elements connected to and facing outwardly of one end of the bolster for respective selective coupling with the different complementary male and female coupling elements; means operatively associated with the coupling elements for releasably locking the first-mentioned male element with respect to the complementary female element; and means connected to and facing outwardly of the bolster on an end thereof opposite to the male and female coupling elements for connection to one of a rail car, a locomotive, and other vehicles.

17. A transition vehicle as defined in claim 16 further comprising means for shifting at least one of the coupling elements between an extended position, for mating with the different complementary coupling elements on the bi-modal rail-highway vehicle, and a retracted position where the at least one of the coupling elements is incapable of mating with the different complementary coupling elements.

18. A transition vehicle as defined in claim 17 wherein the at least one of the coupling elements is the male coupling element; the female coupling element being fixedly mounted on the bolster; and the male element including means for mating with the female element wherein the extended position.

19. A transition vehicle as defined in claim 18 further including means operatively associated with the coupling elements for releasably locking the male element with respect to the female element.

20. A transition vehicle as defined in claim 16 wherein the male and female elements are parallel and are offset from each other on the bolster for permitting selective engagement with the different complementary coupling elements adjacent opposite ends of the bi-modal rail-highway vehicle.

21. A universal coupling adapter for forming trains of rail-highway vehicles having different complementary connecting means, the adapter comprising: a bolster; a plurality of different connecting elements located on the bolster for alternative selective engagement with the different complementary connecting means on the rail-highway vehicle for connecting one end of said vehicle to one end of the bolster; means operatively associated with the coupling elements for releasably locking a male element with respect to a female element; and additional connecting means located on the bolster for connecting said bolster to another vehicle at an end of the bolster opposite to the one end.

22. A universal coupling adapter as defined in claim 21 wherein the different connecting elements comprise a male element and a female element.

* * * * *

UNITED STATES PATENT AND TRADEMARK OFFICE
CERTIFICATE OF CORRECTION

PATENT NO. : 5,152,228

DATED : October 6, 1992

INVENTOR(S) : Thomas G. Donkin

It is certified that error appears in the above-identified patent and that said Letters Patent is hereby corrected as shown below:

Column 9, Lines 19-20  " Expect "  should be — Except —

Column 12, Line 1 "before"  should be — bore —

Column 12, Lline 24 " then"  should be — when —

Column 14, Line 24 "wherein"  should be  — when in —

Signed and Sealed this

Nineteenth Day of October, 1993

Attest:

BRUCE LEHMAN

Attesting Officer     Commissioner of Patents and Trademarks